United States Patent [19]

Liu et al.

[11] 4,237,430
[45] Dec. 2, 1980

[54] COAXIAL DISCHARGE SEALED-OFF QUARTZ LASER TUBE

[75] Inventors: Chi-Sheng Liu, Monroeville; Roy K. Williams, Murrysville; Lelland A. Weaver, Wilkins Township, all of Pa.

[73] Assignee: Westinghouse Electric Corp., Pittsburgh, Pa.

[21] Appl. No.: 15,844

[22] Filed: Feb. 27, 1979

[51] Int. Cl.³ .............................................. H01S 3/02
[52] U.S. Cl. ............................................. 331/94.5 D
[58] Field of Search ................... 331/94.5 D, 94.5 G, 331/94.5 C

[56] References Cited
U.S. PATENT DOCUMENTS 3,898,586  8/1975  Nelson et al. ................. 331/94.5 G

*Primary Examiner*—William L. Sikes
*Attorney, Agent, or Firm*—M. P. Lynch

[57] ABSTRACT

A quartz laser tube for use with a metal, or metal halide, laser media employs a coaxial electrical connection in which a longitudinal discharge in the laser medium serves as the central conductor, and the ground return path is a cylindrical metal container which surrounds the laser discharge. This arrangement minimizes the circuit inductance for a given longitudinal discharge, and the outer metal cylinder serves both as a heat shield and a ground shield for reducing electrical noise radiation. Optical access in the longitudinal direction is provided by cylindrically-symmetrical electrode/window assemblies attached to either end of the quartz laser discharge tube.

6 Claims, 2 Drawing Figures

COAXIAL DISCHARGE SEALED-OFF QUARTZ LASER TUBE

This invention resulted from work performed under U.S. Navy Contract No. N00014-74-C-0445 (ONR).

BACKGROUND OF THE INVENTION

Metals such as lead, and most metal halides such as copper bromide, can operate as visible lasers at temperatures below the ~ 1100° C. limit of quartz envelopes. This feature is especially attractive for practical laser systems, since quartz optical windows, quartz:molybdenum seals and relatively straightforward glassblowing fabrication techniques can be employed for the laser discharge tube assemblies. The quartz laser discharge tube technology can operate with very long lifetimes in the all-hot, sealed-off configuration.

An additional requirement for metal or metal halide lasers is a low inductance electrical circuit to provide very rapid current rise times for the laser discharge, and a thermal enclosure to employ waste heat from the discharge in raising the tube temperature to the desired operating range. This combination of features provides efficient electrical excitation at high temperatures without the need for an external heating source. In addition, all tube materials must be capable of withstanding high temperatures, thermal cycling and exposure to metal halides. The tube design described herein satisfies all of these requirements simultaneously.

SUMMARY OF THE INVENTION

There is disclosed herein with reference to the accompanying drawings a laser assembly employing a coaxial electrical connection in which a longitudinal discharge in the laser medium serves as a central conductor, and the ground return path is a cylindrical metal container which surrounds the laser discharge tube assembly. This arrangement minimizes the circuit inductance for a given longitudinal discharge, and the outer metal cylinder serves both as a heat shield and a ground shield for reducing both the oxidation of the molybdenum and the electrical noise radiation.

The disclosed laser assembly employs quartz and molybdenum discharge tube materials for long lifetimes in a completely sealed-off laser tube construction which provides for chemically-equilibrated operation. The coaxial electrical configuration not only minimizes circuit inductance, but maximizes current rise time for a given length of longitudinal discharge thus resulting in increased laser conversion efficiency. The total laser assembly is capable of operating at temperatures up to 1100° C., as required for most metal and metal halide laser media, while the outer wall operating temperature is approximately 100° C. or less. The laser assembly produces a self-heated thermal enclosure which provides the required laser operating temperatures from the waste discharge heat thus minimizing the requirement for an external oven.

The laser tube as described herein is termed a "all-hot" discharge tube in that the operation is such that there is no irreversible loss of laser material due to condensation on cold spots which are inherently present in conventional laser assemblies which include windows and feedthroughs at temperatures substantially below the elevated laser operating temperature.

BRIEF DESCRIPTION OF THE DRAWING

The invention will become more apparent from the following exemplary description in connection with the accompanying drawings.

DESCRIPTION OF THE PREFERRED EMBODIMENT

Figure 1:
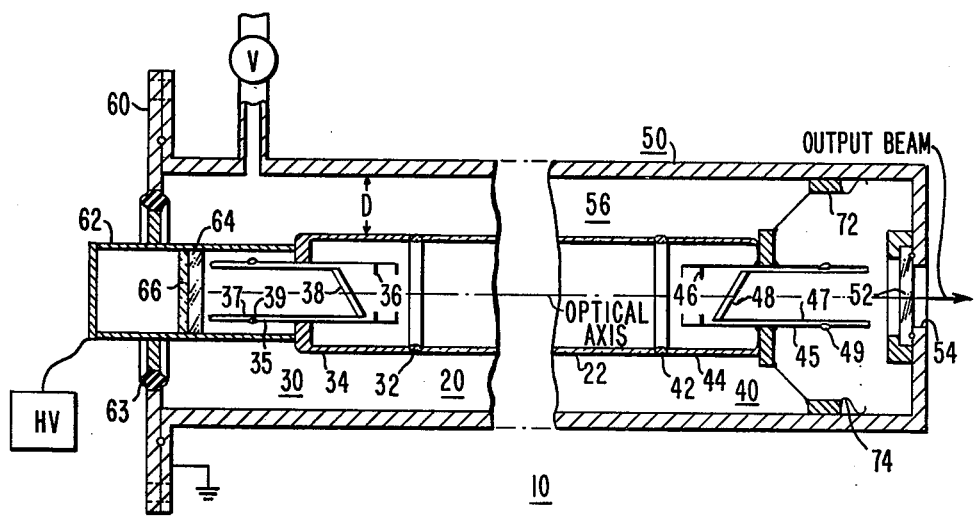
FIG. 1 is a sectioned schematic illustration of a laser assembly employing the inventive features.

Referring to FIG. 1 there is a sectioned illustration of a laser assembly 10 including a quartz laser discharge tube assembly 20 positioned concentrically within a tubular metal housing 50. The quartz laser tube assembly 20 consists of a quartz laser discharge tube 22 and electrode/window assemblies 30 and 40 sealed to either end of the discharge tube 22 by quartz:molybdenum tubular seals 32 and 42 respectively. The seals 32 and 42 are commercially available from Bomco Inc.

Figure 2:
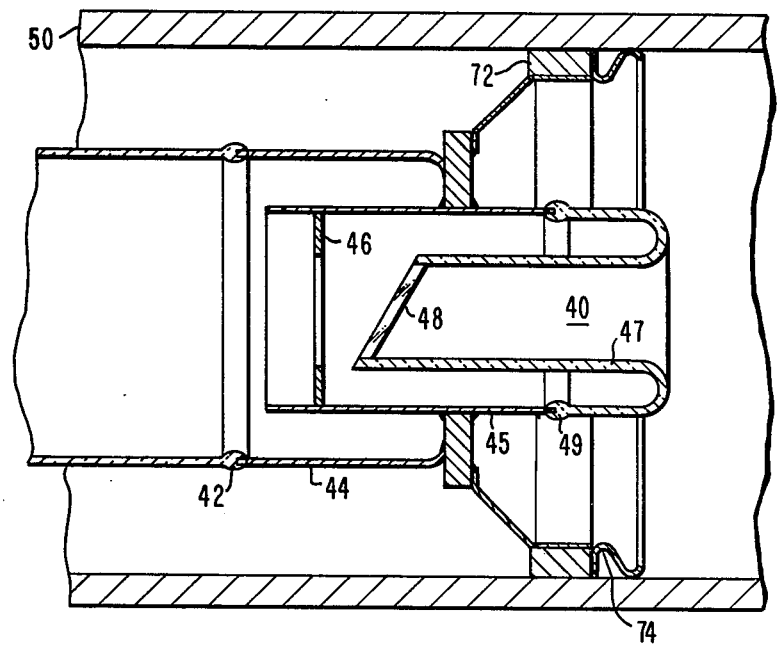
FIG. 2 is a detailed illustration of an electrode/window assembly of FIG. 1.

The electrode/window assemblies 30 and 40, which are illustrated in detail in FIG. 2, consist of openended molybdenum cup members 34, 44 having molybdenum tubular elements 35 and 45 respectively extending through and sealed to the cup members 34 and 44 with a molybdenum electrode element 36 and 46. Electrode elements 36 and 46 are washer-like elements extending perpendicularly from the inner surface of the tubular members 35 and 45 in the laser discharge region. The tubular members 35 and 45 of the electrode/window assemblies 30 and 40 are coaxially disposed about the optical axis of the laser assembly 10 which corresponds to the longitudinal axis about which the quartz laser tube 22 and metal housing 50 are concentrically located. The molybdenum elements of the assemblies 30 and 40 may be separate elements welded in combination or may constitute a single integral member. Brewster angle windows 38 and 48, fabricated entirely from quartz, are fused to an open end of tubular quartz adapters 37 and 47 which are sealed to the molybdenum tubular elements 35 and 45 respectively by quartz:molybdenum seals 39 and 49.

The quartz laser tube assembly 20 is secured to a molybdenum flange 60 by a tubular molybdenum member 62 which is welded to the molybdenum cup 34 and extends through and is welded to the flange member 60. A totally reflective mirror 64 is secured to a molybdenum plate member 66 which is welded within the tubular member 62 and in cooperation with the partially transmissive, partially reflective output mirror 52 sealed an opening 54 in the end of the metal housing 50 forms the optical discharge cavity for the laser assembly 10.

The quartz laser discharge tube assembly 20, as it is secured to the flange 60, can be inserted and removed from the tubular metal housing 50 with the assistance of the metal spring contacts 72 and 74 which are welded to the molybdenum cup member 44 and contact the inner surface of the tubular metal housing 50. The metal spring contact members 72 and 74 not only enhance the slidable movement of the assembly 20 within the tubular metal housing 50, but also function to assure the optical alignment of the assembly 20 with the output mirror 52. A cylindrical electrical insulator 63 sealed within the flange member 60 electrically isolates the electrode/window assembly 30 from the tubular metal housing 50 while a path of electrical conductivity is established between the tubular metal housing 50 and the electrode/window assembly 40 via the metal spring contact members 72 and 74. Thus, electrical discharge excitation of the laser assembly 10 can be suitably initiated by connecting the molybdenum member 62 which is welded to the electrode/window assembly 30 to a high voltage excitation means HV and connecting the electrode/window assembly 40 to an electrical ground via the tubular metal housing 50 and that portion of the metal flange 60 which is electrically isolated from the molybdenum tube 62. With the exception of the flange 60, the metal spring contacts 72 and 74, the windows 38 and 48, and the reflector mirror, the entire quartz laser tube assembly 20 is constructed from quartz and molybdenum, which will withstand the temperature and chemical constraints of a metal, i.e., lead, or metal halide laser media. Assuming a laser media within the quartz discharge tube 22 of lead vapor and a suitable buffer gas such as neon, the lead vapor within the tube 22 will contact only quartz and molybdenum. A detailed discussion and description of metal halide laser systems is presented in U.S. Pat. Nos. 3,934,211; 3,936,722 and 4,048,587, all of which are assigned to the assignee of the present invention, and incorporated herein by reference.

The concentric positioning of the quartz laser tube assembly 20 within and spaced apart from the tubular metal housing 50, which is typically copper, permits the quartz laser tube assembly 20 to operate at suitable operating temperatures for a metal halide laser, i.e., 1100° C., while maintaining the temperature of the tubular metal housing 50 at a significantly lower temperature, i.e., 100° C. This temperature reduction is achieved by evacuating the region 56 between the quartz tubular laser assembly 20 and the inner surface of the tubular metal housing 50 and by providing a spaced-apart distance D which is sufficient to dissipate the discharge heat of the quartz laser tube assembly 20. A further temperature reduction can be achieved by coating the inner surface of the tubular metal housing 50 with a IR reflector. For typical operating conditions a 1" diameter quartz discharge tube 22 would require a tubular metal housing 50 having an inner diameter of between about 3" and 6".

The Brewster angle windows 38 and 48 extend into the discharge heated regions so that the temperature at the window surface will be high enough to prevent lead condensation on the window. In the event the selfheating produced by the laser discharge is not sufficient to maintain the window at a suitably high temperature to avoid lead condensation, it may be necessary to provide auxiliary heaters (not shown) for the windows 38 and 48. Additionally, the distance between the surfaces of the windows 38 and 48 and the corresponding molybdenum tubular elements 35 and 45 should be sufficient to prevent electrode sputtering from obscuring the windows. While the total length of the quartz laser tube assembly 20 is basically unrestricted, as a practical matter discharge lengths of between approximately 50 and 100 centimeters are typical.

We claim:
1. A laser assembly comprising:
a tubular metal housing;
an open-ended tubular quartz laser discharge tube including a laser medium contained therein positioned within said tubular metal housing;
a first and second tubular molybdenum electrode means sealed to either end of said tubular quartz laser discharge tube, the longitudinal axis of said tubular molybdenum electrode means coinciding with the longitudinal axis of said tubular quartz laser discharge tube, said axis being the optical axis of said laser assembly;
laser windows sealed within said first and second tubular molybdenum electrode means to totally enclose the internal volume of said tubular quartz laser discharge tube;
electrical contact means extending between said first molybdenum electrode means and said tubular metal housing to provide electrical continuity therebetween;
mounting means connected to said second molybdenum electrode means for securing the combination of said quartz laser discharge tube and said first and second molybdenum electrode means within said tubular metal housing while electrically isolating said second molybdenum electrode means from said tubular metal housing;
electrical excitation means operatively connected to said second molybdenum electrode means to initiate laser discharge excitation within said tubular quartz laser discharge tube, said tubular metal housing being connected to an electrical ground with the longitudinal electrical discharge produced in said laser medium in response to said electrical excitation means extending between said first and second molybdenum electrode means, said longitudinal discharge serving as a central electrical conductor for said laser assembly and said tubular metal housing functioning as a ground return path which surrounds the laser discharge thereby minimizing the circuit inductance associated with the longitudinal discharge, said tubular metal housing functioning both as a heat shield and a ground shield for reducing electrical noise radiation.

2. The laser assembly as claimed in claim 1 wherein said laser windows are quartz Brewster angle windows.

3. The laser assembly as claimed in claim 1 wherein the space between said tubular quartz laser discharge tube and the surrounding tubular metal housing is evacuated.

4. The laser assembly as claimed in claim 1 wherein said laser medium is a metal or metal halide laser medium.

5. The laser assembly as claimed in claim 1 wherein said first and second tubular molybdenum electrode means include annular electrode elements coaxially disposed about the optical axis and extending perpendicularly toward said axis.

6. The laser assembly as claimed in claim 1 wherein said electrical contact means consists of a metal support means extending between said first tubular molybdenum electrode means and the inner surface of said tubular metal housing to provide both electrical continuity therebetween and mechanical positioning and alignment of said tubular quartz laser discharge tube within said tubular metal housing.

* * * * *